(12) United States Patent
Mowry

(10) Patent No.: US 8,194,168 B2
(45) Date of Patent: Jun. 5, 2012

(54) MULTI-DIMENSIONAL IMAGING SYSTEM AND METHOD

(75) Inventor: Craig Mowry, Southampton, NY (US)

(73) Assignee: Mediapod LLC, Wilmington, DE (US)

(*) Notice: Subject to any disclaimer, the term of this patent is extended or adjusted under 35 U.S.C. 154(b) by 823 days.

(21) Appl. No.: 11/447,406

(22) Filed: Jun. 5, 2006

(65) Prior Publication Data

US 2006/0274188 A1 Dec. 7, 2006

Related U.S. Application Data

(60) Provisional application No. 60/686,883, filed on Jun. 3, 2005, provisional application No. 60/688,454, filed on Jun. 9, 2005, provisional application No. 60/692,502, filed on Jun. 21, 2005, provisional application No. 60/692,501, filed on Jun. 21, 2005, provisional application No. 60/693,011, filed on Jun. 22, 2005, provisional application No. 60/696,829, filed on Jul. 6, 2005, provisional application No. 60/701,424, filed on Jul. 22, 2005, provisional application No. 60/702,910, filed on Jul. 27, 2005, provisional application No. 60/711,345, filed on Aug. 25, 2005, provisional application No. 60/710,868, filed on Aug. 25, 2005, provisional application No. 60/712,189, filed on Aug. 29, 2005, provisional application No. 60/727,538, filed on Oct. 16, 2005, provisional application No. 60/732,347, filed on Oct. 31, 2005, provisional application No. 60/739,142, filed on Nov. 22, 2005, provisional application No. 60/739,881, filed on Nov. 25, 2005, provisional application No. 60/750,912, filed on Dec. 15, 2005.

(51) Int. Cl.
*H04N 5/225* (2006.01)

(52) U.S. Cl. ...................................... 348/335

(58) Field of Classification Search .................... 348/335
See application file for complete search history.

(56) References Cited

U.S. PATENT DOCUMENTS 4,146,321 A 3/1979 Melillo .................. 396/442
(Continued)

FOREIGN PATENT DOCUMENTS

EP 1 014 112 6/2000
(Continued)

OTHER PUBLICATIONS

Patent Cooperation Treaty, "Notification of Transmittal of the Internaitonal Search Report and the Written Opinion of the International Searching Authority, of the Declaration," International Searching Authority, 2008, 10 pages.

(Continued)

*Primary Examiner* — Lin Ye
*Assistant Examiner* — Amy Hsu
(74) *Attorney, Agent, or Firm* — Turocy & Watson, LLP

(57) ABSTRACT

Disclosed is a camera to provide images for use in multi-dimensional imaging. In an embodiment, the camera includes an image gathering lens operable to obtain a lens image of a visual, a plurality of optic modules operable to provide distinct focusing options for the lens image, a relaying module operable to relay at least part of the lens image to the plurality of optic modules and a plurality of capture devices operable to capture a plurality of distinct versions of the lens image from the plurality of optic modules relayed from the relaying module. In another embodiment, a multi-dimensional imaging system is provided that includes a camera, such as described above, and further includes a computing device operable to receive and display the plurality of distinct versions, and a data management module operable to receive data related to the distinct versions and to display the distinct versions on separate displays.

20 Claims, 3 Drawing Sheets

U.S. PATENT DOCUMENTS

| | | | | |
|---|---|---|---|---|
| 4,561,745 | A | | 12/1985 | Kinsman et al. ............... 396/571 |
| 4,689,696 | A | | 8/1987 | Plummer ......................... 386/43 |
| 4,710,806 | A | | 12/1987 | Iwai et al. ................. 375/240.01 |
| 4,727,425 | A | | 2/1988 | Mayne et al. .................. 358/523 |
| 5,140,414 | A | | 8/1992 | Mowry .......................... 348/577 |
| 1,912,582 | A | | 6/1993 | Kelley ............................ 355/77 |
| 5,374,954 | A | | 12/1994 | Mowry .......................... 348/121 |
| 5,406,326 | A | | 4/1995 | Mowry .......................... 348/121 |
| 5,457,491 | A | | 10/1995 | Mowry .......................... 348/104 |
| 5,666,569 | A | * | 9/1997 | Fullam et al. .................. 396/101 |
| 5,687,011 | A | | 11/1997 | Mowry .......................... 358/527 |
| 5,790,086 | A | | 8/1998 | Zelitt ............................. 345/32 |
| 5,815,748 | A | | 9/1998 | Hamamura et al. .......... 396/104 |
| 5,889,553 | A | * | 3/1999 | Kino et al. ................. 348/218.1 |
| 5,940,641 | A | | 8/1999 | McIntyre et al. .............. 396/332 |
| 5,953,054 | A | * | 9/1999 | Mercier .......................... 348/50 |
| 6,014,165 | A | | 1/2000 | McIntyre et al. .............. 348/64 |
| 6,141,034 | A | * | 10/2000 | McCutchen .................... 348/36 |
| 6,143,459 | A | | 11/2000 | Vizard .......................... 430/139 |
| 6,215,516 | B1 | * | 4/2001 | Ma et al. ......................... 348/43 |
| 6,275,253 | B1 | * | 8/2001 | Melen ............................. 348/43 |
| 6,323,858 | B1 | * | 11/2001 | Gilbert et al. ................. 345/419 |
| 6,396,627 | B1 | * | 5/2002 | Tachihara et al. ............. 359/363 |
| 6,414,791 | B1 | * | 7/2002 | Sugawara ..................... 359/497 |
| 6,505,003 | B1 | | 1/2003 | Malloy |
| 6,553,187 | B2 | | 4/2003 | Jones ............................. 396/429 |
| 6,577,341 | B1 | * | 6/2003 | Yamada et al. ................ 348/272 |
| 6,593,958 | B2 | | 7/2003 | Kremen .......................... 348/51 |
| 6,665,493 | B2 | | 12/2003 | Miyazaki et al. ............. 396/408 |
| 6,900,841 | B1 | * | 5/2005 | Mihara .......................... 348/345 |
| 6,913,826 | B2 | | 7/2005 | Lee et al. ...................... 428/402 |
| 6,929,905 | B2 | | 8/2005 | Gordon et al. ................ 430/361 |
| 6,933,962 | B2 | * | 8/2005 | Yamamoto ...................... 348/45 |
| 7,061,532 | B2 | * | 6/2006 | Silverstein .................... 348/335 |
| 7,102,686 | B1 | * | 9/2006 | Orimoto et al. ............... 348/375 |
| 7,190,389 | B1 | * | 3/2007 | Abe et al. ....................... 348/42 |
| 7,397,501 | B2 | * | 7/2008 | Afsenius .................... 348/218.1 |
| 7,417,682 | B2 | * | 8/2008 | Kuwakino et al. ............ 348/345 |
| 7,443,447 | B2 | * | 10/2008 | Shirakawa .................... 348/376 |
| 7,619,656 | B2 | | 11/2009 | Ben-Ezra et al. |
| 7,876,357 | B2 | * | 1/2011 | Jung et al. .................. 348/207.1 |
| 2001/0019361 | A1 | * | 9/2001 | Savoye .......................... 348/222 |
| 2001/0019450 | A1 | * | 9/2001 | Ogino ........................... 359/462 |
| 2001/0020954 | A1 | | 9/2001 | Hull et al. ..................... 715/730 |
| 2002/0009300 | A1 | * | 1/2002 | Fujiwara ........................ 396/324 |
| 2002/0057907 | A1 | | 5/2002 | Kamata ............................ 396/6 |
| 2003/0164875 | A1 | * | 9/2003 | Myers ............................. 348/52 |
| 2003/0202106 | A1 | | 10/2003 | Kandleinsberger et al. ...................... 348/207.99 |
| 2003/0231255 | A1 | | 12/2003 | Szajewski et al. ............ 348/340 |
| 2004/0001139 | A1 | | 1/2004 | Kobayashi ...................... 348/59 |
| 2004/0032531 | A1 | * | 2/2004 | Mercier ........................ 348/584 |
| 2004/0101043 | A1 | * | 5/2004 | Flack et al. ................ 375/240.01 |
| 2004/0119831 | A1 | * | 6/2004 | Miyawaki ................ 348/207.99 |
| 2004/0130649 | A1 | * | 7/2004 | Lee ................................ 348/345 |
| 2005/0012843 | A1 | * | 1/2005 | Kuwakino et al. ............ 348/335 |
| 2005/0041117 | A1 | | 2/2005 | Yamagishi ................. 348/231.2 |
| 2005/0057687 | A1 | | 3/2005 | Irani et al. |
| 2005/0117016 | A1 | | 6/2005 | Surman ........................... 348/51 |
| 2005/0151838 | A1 | | 7/2005 | Fujita et al. ..................... 348/39 |
| 2005/0270387 | A1 | * | 12/2005 | Watanabe et al. ........ 348/240.99 |
| 2006/0221209 | A1 | * | 10/2006 | McGuire et al. ............. 348/239 |
| 2007/0122029 | A1 | * | 5/2007 | Mowry .......................... 382/154 |
| 2007/0160360 | A1 | | 7/2007 | Mowry |
| 2009/0195664 | A1 | | 8/2009 | Mowry |

FOREIGN PATENT DOCUMENTS

| | | |
|---|---|---|
| GB | 01073 | 1/1916 |
| GB | 921 706 | 3/1963 |
| GB | 2 072 866 | 10/1981 |
| GB | 2 317 020 | 3/1998 |
| JP | 07-143439 | 6/1995 |
| WO | WO 2007/014329 | 2/2007 |

OTHER PUBLICATIONS

"QuickTime VR Authoring Studio," *Apple Computer Inc.*, U.S.A., http://web.archive.org/web/20050329120354/http://manuals.info.apple.com/en/QuickTimeVR__AuthoringStudioUSerManual.pdf, Mar. 29, 2005, 108 pages.

PCT International Preliminary Report on Patentability issued Jan. 29, 2008, in corresponding International Application No. PCT/US2006/029407.

PCT International Search Report issued Feb. 7, 2007, in corresponding International Application No. PCT/US2006/029407.

EP Search Report for EP Application No. 06802320.9, dated Apr. 17, 2012, 9 pages.

* cited by examiner

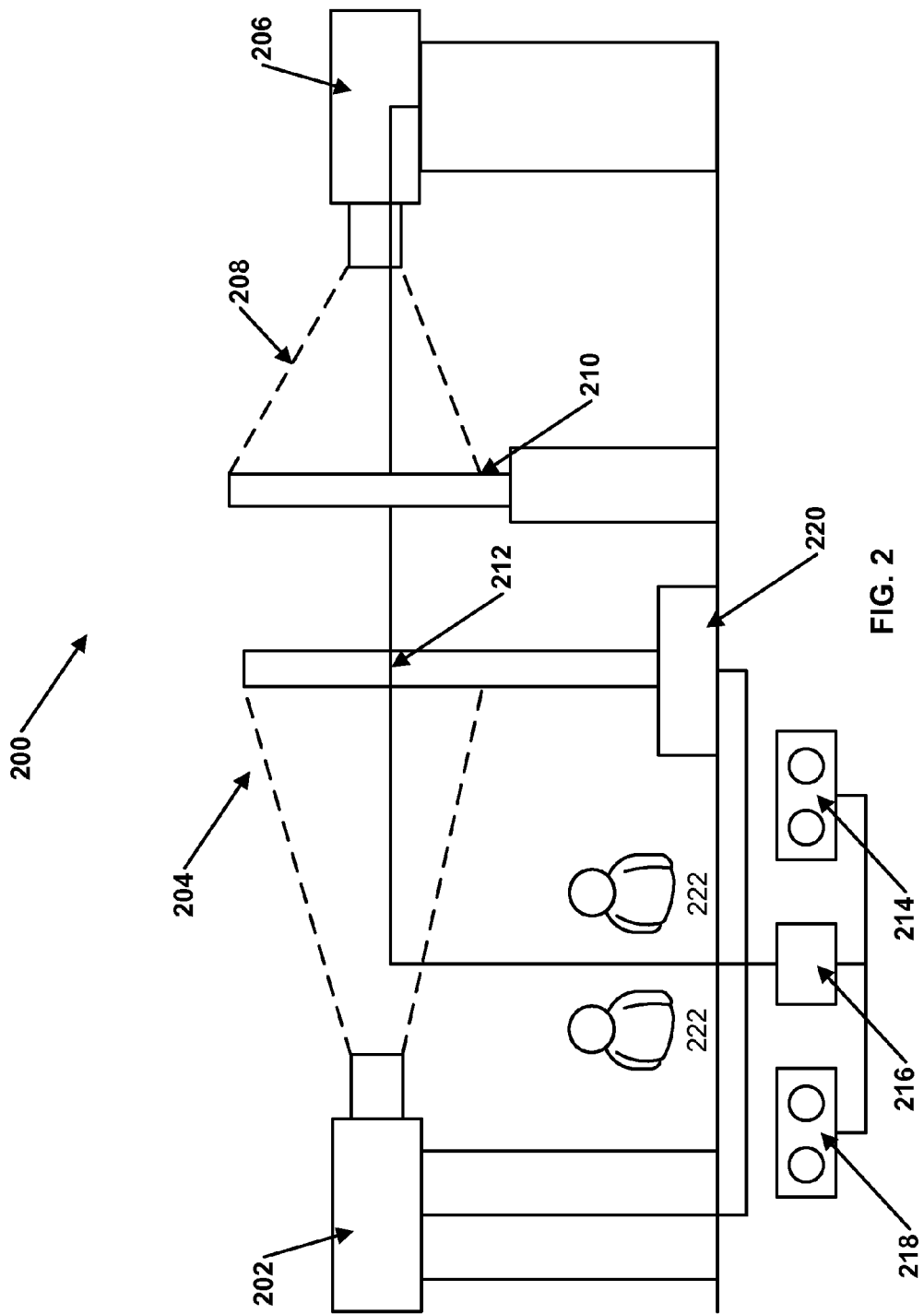

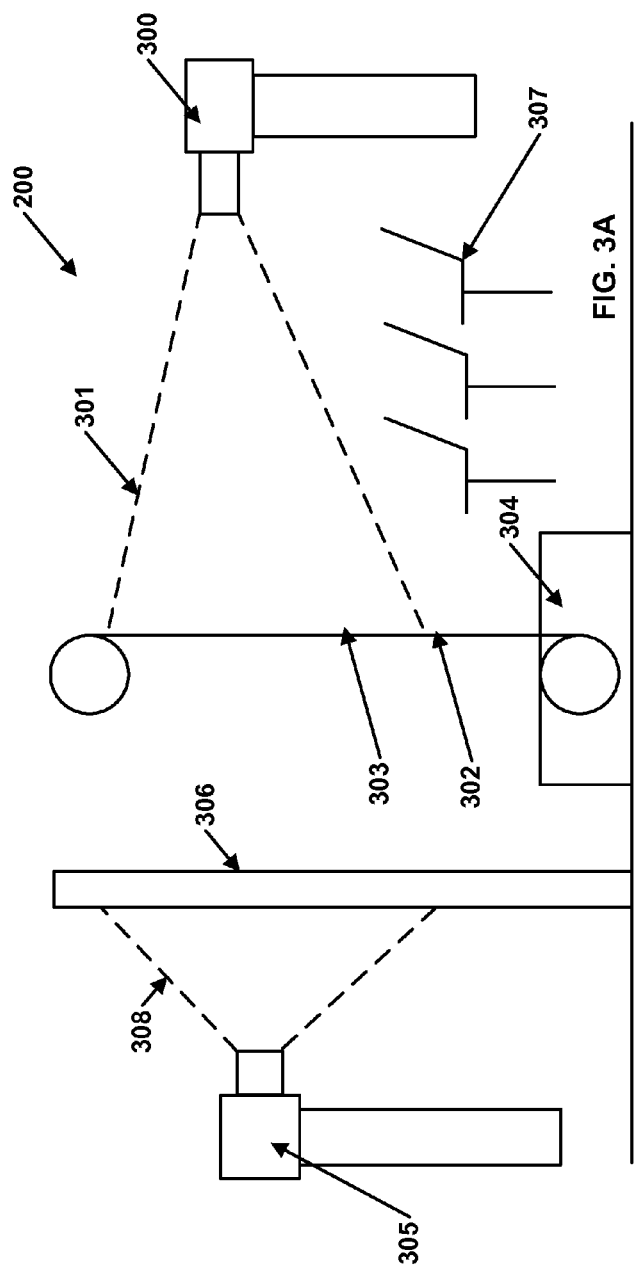
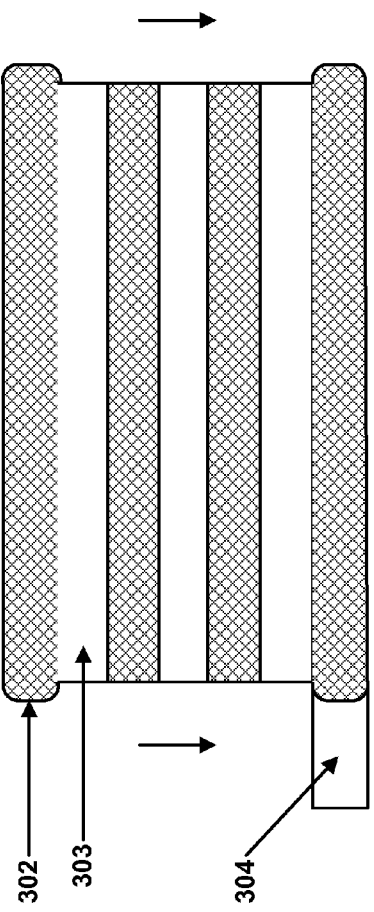
FIG. 3A
FIG. 3B

MULTI-DIMENSIONAL IMAGING SYSTEM AND METHOD

CROSS-REFERENCE TO RELATED APPLICATIONS

The present application is based on and claims priority to U.S. Provisional Patent Application Ser. No. 60/686,883, filed on Jun. 3, 2005 and entitled "METHOD AND SYSTEM FOR CAPTURING AND DISPLAYING A VISUAL IN MULTIPLE LAYERS, BASED ON DIFFERENT FOCUSING PRIORITIES," U.S. Provisional Patent Application Ser. No. 60/688,454, filed on Jun. 9, 2005 and entitled "SYSTEM, METHOD AND APPARATUS FOR CAPTURING AND SCREENING TWO OR MORE DIFFERENTLY FOCUSED VERSIONS OF THE SAME LENS IMAGE, AND OR SAME VISUAL SCENE," U.S. Provisional Patent Application Ser. No. 60/692,502, filed on Jun. 21, 2005 and entitled "METHOD, SYSTEM AND APPARATUS FOR EXPOSING IMAGES ON BOTH SIDES OF CELLOID OR OTHER PHOTO SENSITIVE BEARING MATERIAL," U.S. Provisional Application Ser. No. 60/692,501, filed on Jun. 21, 2005 and entitled METHOD, SYSTEM AND APPARATUS FOR PROVIDING EXPANDABLE OR ELASTIC PHOTOGRAPHIC FILM TO INCREASE IMAGE QUALITY, U.S. Provisional Application Ser. No. 60/693,011, filed on Jun. 22, 2005 and entitled FILM SHEATH ASSEMBLY SYSTEM, METHOD AND APPARATUS FOR USE IN DIGITAL FILM SIMULATION, U.S. Provisional Application Ser. No. 60/696,829, filed on Jul. 6, 2005 and entitled METHOD, SYSTEM AND APPARATUS FOR CAPTURING VISUALS AND/OR VISUAL DATA AND SPECIAL DEPTH DATA RELATING TO OBJECTS AND/OR IMAGE ZONES WITHIN SAID VISUALS SIMULTANEOUSLY, U.S. Provisional Application Ser. No. 60/701,424, filed on Jul. 22, 2005 and entitled METHOD, SYSTEM AND APPARATUS FOR INCREASING QUALITY OF FILM CAPTURE, U.S. Provisional Application Ser. No. 60/702,910, filed on Jul. 27, 2005 and entitled SYSTEM, METHOD AND APPARATUS FOR CAPTURING AND SCREENING VISUALS FOR MULTI-DIMENSIONAL DISPLAY, U.S. Provisional Application Ser. No. 60/711,345, filed on Aug. 25, 2005 and entitled SYSTEM, METHOD APPARATUS FOR CAPTURING AND SCREENING VISUALS FOR MULTI-DIMENSIONAL DISPLAY (ADDITIONAL DISCLOSURE), U.S. Provisional Application Ser. No. 60/710,868, filed on Aug. 25, 2005 and entitled A METHOD, SYSTEM AND APPARATUS FOR INCREASING QUALITY OF FILM CAPTURE, U.S. Provisional Application Ser. No. 60/712,189, filed on Aug. 29, 2005 and entitled A METHOD, SYSTEM AND APPARATUS FOR INCREASING QUALITY AND EFFICIENCY OF FILM CAPTURE, U.S. Provisional Application Ser. No. 60/727,538, filed on Oct. 16, 2005 and entitled A METHOD, SYSTEM AND APPARATUS FOR INCREASING QUALITY OF DIGITAL IMAGE CAPTURE, U.S. Provisional Application Ser. No. 60/732,347, filed on Oct. 31, 2005 and entitled A METHOD, SYSTEM AND APPARATUS FOR INCREASING QUALITY AND EFFICIENCY OF FILM CAPTURE WITHOUT CHANGE OF FILM MAGAZINE POSITION, U.S. Provisional Application Ser. No. 60/739,142, filed on Nov. 22, 2005 and entitled DUAL FOCUS, U.S. Provisional Application Ser. No. 60/739,881, filed on Nov. 25, 2005 and entitled SYSTEM AND METHOD FOR VARIABLE KEY FRAME FILM GATE ASSEMBLAGE WITHIN HYBRID CAMERA ENHANCING RESOLUTION WHILE EXPANDING MEDIA EFFICIENCY, U.S. Provisional Application Ser. No. 60/750,912, filed on Dec. 15, 2005 and entitled A METHOD, SYSTEM AND APPARATUS FOR INCREASING QUALITY AND EFFICIENCY OF (DIGITAL) FILM CAPTURE, the entire contents of which are hereby incorporated by reference.

BACKGROUND OF THE INVENTION

1. Field of the Invention

The present invention relates to image capture and screening, and, more particularly, to multi-dimensional image capture and screening.

2. Description of the Related Art

As cinema and television technology converge, allowing the home viewer to enjoy many of the technological benefits once reserved for movie theaters, the need initially for additional experiential impact in theaters increases. Resolution, choice, sound and other aspects of home viewing have improved and expanded, as have the viewing options and quality of media presented by computer and Internet options. In time, any benefit of the cinema experience will be minimized to the point of potentially threatening that viewing venue, and industry, entirely.

Currently, no system or method exists in the prior art to provide aesthetically superior visuals multi-dimensionally, without the need of special glasses for viewers, or the like.

SUMMARY

It is an object of the present invention to provide visuals multi-dimensionally, without the need of special glasses for viewers, or the like an approach to that objective based on the possibilities created in the digital realm, with regards to both image capture and screening.

In one embodiment, the present invention comprises a camera that is operable to provide multi-dimensional imaging. The camera comprises an image gathering lens operable to obtain a lens image of a visual. Further, a plurality of optic modules are provided that are operable for distinct focusing options for the lens image. Moreover, a relaying module is included that is operable to relay at least part of the lens image to the plurality of optic modules. Moreover, a plurality of capture devices operable to capture a plurality of distinct versions of the lens image from the plurality of optic modules relayed from the relaying module.

In another embodiment, multi-dimensional imaging system is provided that includes a camera, such as described above, and further includes a computing device operable to receive and display the plurality of distinct versions, and a data management module operable to receive data related to the distinct versions and to display the distinct versions on separate displays.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIG. 2 illustrates a multi-screen display venue in accordance with an embodiment; and FIGS. 3A and 3B illustrate a multi-screen display venue in accordance with an embodiment and include a mechanical screen configuration in accordance with a preferred embodiment.

DESCRIPTION OF THE EMBODIMENTS

Figure 1:
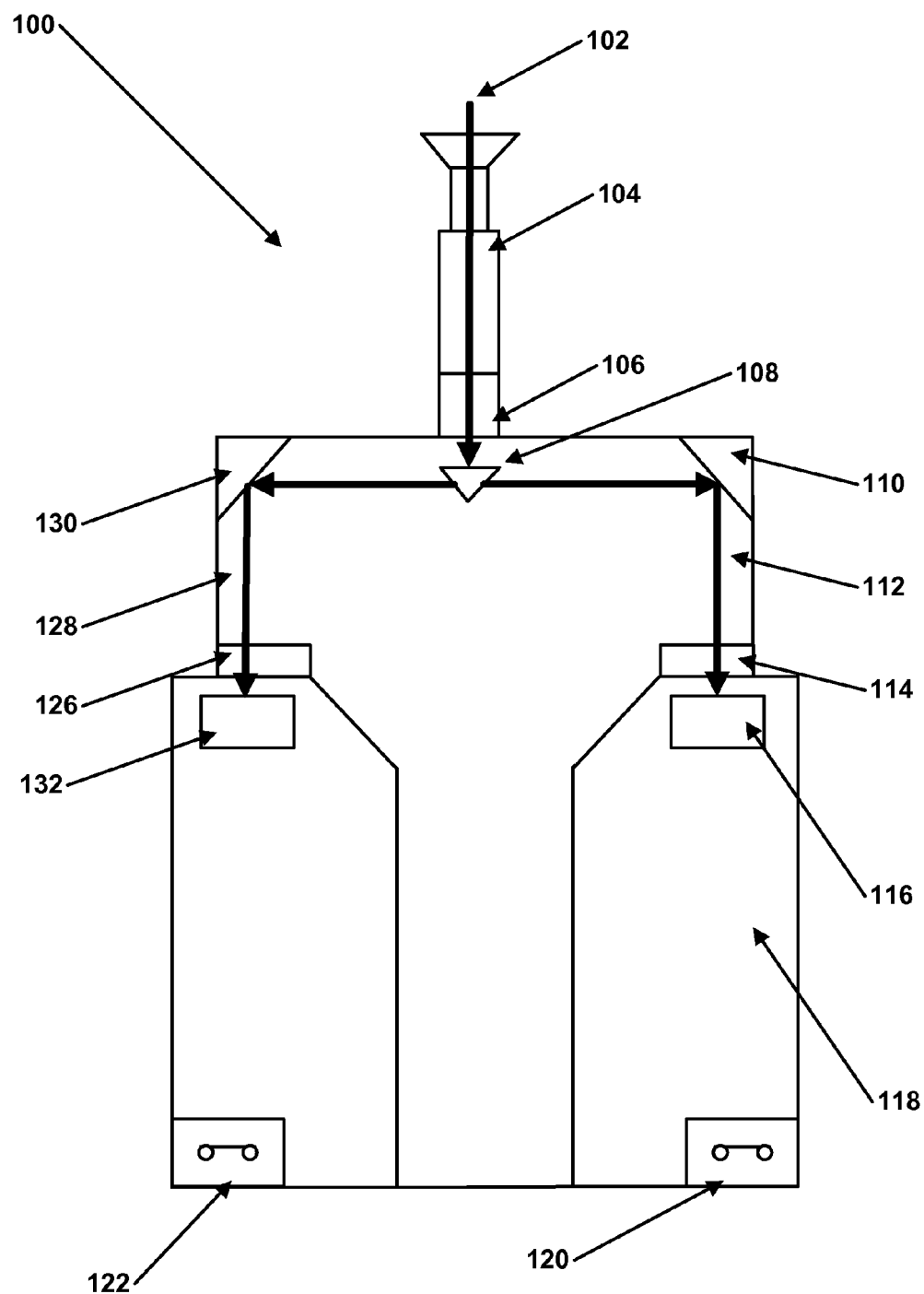
FIG. 1 illustrates a multi focus configuration camera 100 in accordance with an example embodiment.

In accordance with the teachings herein, at least two distinct versions of an image are taken from a single lens, or, alternatively, a plurality of images are taken from a plurality of lenses, and captured to manifest all or some aspects of the respective versions at different distances with regard to respective locations of intended viewers. In one embodiment, two or more differently focused versions represent a distinction between versions. Further, the respective media may be selective and, in one or more embodiments, may be hybrid, such as to include electronic (e.g., digital) capture and film capture.

As used herein, "non-visual data" refer, generally, to any data that are not the digital image data included in an image. The term, "non-visual data" is not meant to exclude data that cannot be seen; instead, non-visual data are data that are not included in an image.

Also as used herein, the term, "module" refers, generally, to one or more discrete components that contribute to the effectiveness of the present invention. Modules can operate or, alternatively, depend upon one or more other modules in order to function.

In an embodiment, one of the two distinct versions of an image is captured as a "key frame," as known in the art, or, more particularly, a plurality of images of one of the image versions may be taken at a lower frame rate than another version. Preferably, a single image from the "key frame" version may serve sufficiently in according with the teachings herein to provide image data relative to more than one of the other version(s), for example, during screening or projection.

In one embodiment, first and second optic pathways are provided for the lens image for the respective distinct captures, and that are operable to capture the image versions. Options available include intermittently full (or selectively full) lens image(s) to the first capture optic pathway preceding one capture means, and then altering the image path, preferably by one or more mirrors, to be conveyed through the second optics preceding the lens image being captured by the first optic pathway. Logically, the priorities of focus of one optic pathway pertain to the "foreground" and "background" of an image for example, relative to the scene being captured.

Preferably, computer executed instructions (e.g., software) are provided to selectively allocate foreground and background (or other differing priority) focused aspects of the scene, and separated the aspects as distinct image information. Moreover, known methods of extraction are performed to detect clear and/or selectively focused aspects of an image, thereby allowing unfocused items within one of the versions, or, alternatively, one image provided by one of the optical pathways, to be selectively extracted to improve visibility of the clearly focused representation. In cases of photography, 2-dimensional motion media display, computer games and/or other monitor presented media, including video-related media, two differently focused versions of a single scene allows for effects within 2-dimensional images not available in the prior art, such as a single image with two distinct and well represented points of focus, thereby affecting as "depth of field" impression of the image, among other options.

In accordance with the teachings herein, two or more display screens or planes on which visual information may be manifest can be used to display images resulting from captures described herein. The following two-screen example configuration is provided, notwithstanding a plurality of screens or planes that may be used.

A foreground display having selective light transmissibility allows for display or reflection, for example, of a projection, and further allows for viewing beyond the foreground display screen to display another version of the lens image, which is preferably manifest separately. The selective spacing of the displays aspects (e.g., screens) selectively affects the multidimensional impression result. Further, the light transmissibility may be provided from a semi-opaque or semi-opaqing means within the foreground (nearer) image version display, which preferably pertains to one capture means. Alternatively, the foreground display may intermittently or continually physically change to selectively reflect, or alternatively, display directly, and, thereafter, allow light to pass, thereby allowing light to be viewed that travels through the foreground display's area, and providing visibility beyond that foreground display screen to what is behind. In case the "background" screen or display means is of a reflective type, a foreground projection means may provide the image to the background display simultaneously during the time of foreground display light transmissibility.

Referring now to the drawings, in which like reference numerals refer to like elements, FIG. 1 illustrates a multi focus configuration camera 100 in accordance with an example embodiment. In the example shown in FIG. 1, multi focus configuration camera 100 is of a high definition digital video type. Of course, one skilled in the art will recognize that multi focus configuration camera 100 may be a film camera or other image capture device in various embodiments.

Continuing with reference to FIG. 1, lens image 102 enters camera lens options 104 including iris 106, which provides optical effects prior to lens image diversion. Lens image diverter 108 may be of a mirroring type, for up to full lens image relay to more than one secondary optics pathway. Alternatively, diverter 108 may be a beam splitter or the like, as known in the like, wherein lens image 102 is divided with regard to the amount of light, thereby allowing up to continual relay of lens image 102 to more than one capture means.

In an example pathway configuration for lens image 102, mirroring aspects 110, 130 receive, intermittently or simultaneously, all or part of lens image 102 and relay lens image 102 in multiple directions as diverted images 112, 128. Mirroring aspects 110, 130 may relay lens image 102 simultaneously, or in a staggered order, to focusing optics aspects 126, 114 for relaying on to image capture devices 116, 132, such as a charged coupled device ("CCD"), preferably after a distinct focusing effect has been imposed and conveyed onto lens image 102 and/or diverted images 112,128. The order of optical elements illustrated in FIG. 1 is not intended to limit the teachings herein. In the example shown in FIG. 1, distinct optical setting choices are imposed to the lens image 102, selectively creating distinct, images that are captured selectively by the image capture devices 116, 132.

Also shown in FIG. 1 are digital video unit housing capture 118 and storage means 120 and 122. Although FIG. 1 illustrates a tape recorder and storage means, data drive or other data storing means may be employed to save the image capture data. Furthermore, a film recording means may be employed, selectively involving more than one film gate in recording the image data onto a single strip of film (e.g., emulsion coated celluloid) or onto separate strips, in a dual "roll" configuration.

Further, in an embodiment in which multi focus configuration camera 100 utilizes film, key frame capturing, as known in the art, is preferably employed. In case, for example, focus priorities that are selected for the two distinct captures, described above, relate simply to foreground and background image aspects, the image recording need not necessarily occur at the same frame rate. For example, a single strip of motion picture film may engage two separate film gates, one receiving a first focus version, the other receiving a second distinct focus version of lens image. The background focus priority, for example, may record at a selected distance from the foreground visual information being captured within the emulsion. In case, for example, multi focus configuration camera 100 uses film, camera 100 may, for example, capture twenty-four (24) frames of foreground focused images, to only one image capture of the background version. In an embodiment in which multi focus configuration camera 100 uses film, capturing distinct versions may be accomplished in various ways, allowing for fluid recording and image distinguishing.

In one example embodiment, the background focused lens image 112 or 128 may be captured by a gate receiving the unexposed film stock prior to the foreground focused lens image gate. As one frame of background visual information, preferably previously exposed onto the film for latent image processing, approaches the foreground focused lens image gate, multi focus configuration camera 100 has specific setting means, based on the selectively disparity in frame rates between the focus versions, to skip two or more frames of film stock before positioning unexposed stock intermittently within the foreground focus version gate. Moreover, a time code recorder, such as a magnetic, visual or other time code tracking means for film, as known in the art, may provide a recording means by multi focus configuration camera 100, in order to save frame (preferably, not visual) data to distinguish the differently focused version film frames after processing, for subsequent digitizing or other options.

Further, as described in U.S. Provisional Patent Application, Ser. No. 60/692,502, cited above, and incorporated by reference herein, double sided film stock option and double sided film stock camera configurations may be provided to allow for distinct versions of the lens image to be recorded selectively on emulsion that occurs on opposite sides of the celluloid or other emulsion bearing strip.

In accordance with an example embodiment, post production processes and related software include data management to provides unique configuration options. The following discussion includes some these configuration options.

Image data extrapolation preferably allows a single key frame of data from one capture source to be repeated and morphed between available key frames, creating a seamless background in selectively sharp focus, from for example one key frame per second. Further, even the "unfocused" aspects of the background from the foreground capture version, may inform positional aspects of the background elements within the sharp focused background version, as the full 24 frames per second (for example) of visual data would be available in that foreground version, selectively.

During post production processes, such as provided via computing devices, selective extraction of elements is further allowed. For example, the foreground focused version, when visible, is preferably manifest closer to viewers, and includes selectively background, less focused, aspects eliminated, thereby allowing only the foreground display to feature image aspects from the background for viewing. Reciprocally, the background display data may be a revised file that includes selectively dropped foreground elements, for example, that are unfocused in that version, thereby allowing only the foreground display to feature visual elements that are in clear focus. Image information from film preferably results from photochemical processing, which is followed by selectively detailed digitization.

Further post production processes may include combining image data from both (or more) capture versions. This process preferably results in a two dimensional image embodying the impression of very deep "depth of field," despite that both versions may well have been captured with a very open iris 106, which typically creates shallow depth of field.

After user-controlled post production options and aesthetic adjustments are made, final image data for foreground and background (or more versions) screening on two or more distinct displays that are positioned relative to viewers, may be provided. Preferably, such displays may be provided for direct view, projection or other. Furthermore, synching processes between components of the display allow for an optimum effect in maintaining an illusion of uninterrupted multi-dimensional visuals, with sharply focused foreground and background. This achieves what the human eye cannot normally accomplish. A simultaneous focus is provided at distinct focal points, which otherwise would require adjustment of focus to view.

Referring now to FIGS. 2, 3A and 3B, multi-screen display venue 200 is shown, including viewers 222, 307 who view foreground capture version 204 and 301, which may be selectively modified a system user. Foreground capture version 204 and 301 is preferably provided by data stores 218, 214, for example, via data manager and synching apparatus 216. Further, imaging unit 202, 300 projects and/or provides foreground capture version 204 and 301 on selectively light transmissible foreground image display 212, which may be provided as a display screen, preferably includes reflective 303 portions and transparent/light transmissible portions 302, for example, in a mechanical screen configuration shown in FIG. 3B.

In the mechanical screen configuration shown in FIGS. 2 and 3, a length of moveable screen is preferably transported via roller motor 220 and 304. The screen preferably moves selectively fast enough to allow the screen to appear solid, with light transmissible aspects vanishing from portion 302 moving at a fast enough pace, allowing for seamless viewing "through" the clearly visible foreground image information as manifest by (or on) display strips 303, which may be direct view device aspects or image reflective aspects, as appropriate.

The foreground display 212 may be of a non-mechanical nature, including the option of a device with semi-opaque properties, or equipped to provide variable semi-opaque properties. Further, foreground display 212 may be a modified direct view device, which features image information related to foreground focused image data, while maintaining transparency, translucency or light transmissibility for a background display and positioned therebehind, selectively continually.

Background display screen 210, 306 features selectively modified image data from background capture version 208, 308, as provided by imaging means 202, 305, which may be a rear projector, direct viewing monitor or other direct viewing device, including a front projector that is selectively the same unit that provides the foreground image data for viewing 202, 300. Background capture version images 208, 308 may be generated selectively continually, or intermittently, preferably, as long as the images that are viewable via the light transmissibility quality or intermittent transmissibility mechanics, are provided with sufficient consistency to maintain a continual, seamless background visual to viewers (i.e., by way of human "persistence of vision.") In this way, viewers vantage point 222, 307 experience a layered, multidimensional effect of multiple points of focus that are literally presented at different distances from them. Therefore, as the human eye is naturally limited to choosing only one "point of focus" at an instance, the constant appearance of multiple focused aspects, or layers, of the same scene, results in a new theatrical aesthetic experience, not found in the prior art.

Although many of the examples described herein refer to theater display, the invention is not so limited. Home display, computer display, computer game and other typical consumer and professional display venues may incorporate a physical separation of layered displays, as taught herein, to accomplish for a similar effect or effects resulting from the availability of the multiple versions of the same lens captured scene. Furthermore, although predominantly foreground focused visuals 204 are generated, such as the conventional 2-dimensional productions in the prior art, the capture of even one background focused "key frame" per second, for example, is valuable. Such data are not utilized presently for film releases, TV or other available venues. However, various ways to utilize a focused key frame of data for viewing and other data managing options, such as described herein, are not currently manifested.

Thus, the focused second capture version data, even if in an occasional "key frame," will allow productions to "save" and have available visual information that otherwise is entirely lost, as even post production processes to sharpen images cannot extrapolate much of the visual information captured when focus reveals visual detail.

Thus, a feature provided herein relates to a way to capture valuable data today, and as new innovations for manifesting the key frame data are developed in the future, tomorrow (like the prior art Technicolor movies) users will have information necessary for a project to be compatible, and more interesting, for viewing systems and technological developments of the future that are capable of utilizing the additional visual data.

The present invention is now further described with reference to the following example embodiments and the related discussion.

Preferably, a multi focus configuration camera 100, production aspects of images taken thereby, and a screening or post-production aspect of the system, such as multi-screen display venue 200 are included.

Initially, a visual enters the camera, preferably via a single capture lens. A selected lens image diverter 108, such as prism or mirror devices, fragments the lens image into two selectively equal (or not) portions of the same collected visual, (i.e., light). Thereafter, separate digitizing (camera) units occur, preferably side-by-side, each receiving a selected one of the split lens image.

Prior to the relaying of the light (lens image portions) to the respective digitizers of these camera units, such as CCD, related chips, or other known digitizers, an additional lensing mechanism provides a separate focus ring (shown as focusing optics aspects 126, 114 in FIG. 1), for each of the respective lens image portions. The focus ring is preferably unique to each of the two or more image versions and allows for one unit to digitize a version of the lens image selectively focused on foreground elements, and the other selectively focused on background elements.

Each camera is operable to record the digitized images of the same lens image, subjected to different focusing priorities by a secondarily imposed lensing (or other focusing means) aspect. Recording may be onto tape, DVD, or any other known digital or video recording options. The descriptions herein are meant to be limited to digital video for TV or cinema, and, instead, include all aspects of film and still photography collection means. Thus, the "recording media" is not at issue, but rather collection and treatment of the lens image.

Lighting and camera settings provide the latitude to enhance various objectives, including usual means to affect depth-of-field and other photographic aspects.

The following discussion describes some post production and screening aspects in an example embodiment. An effective and visually interesting multi-dimensional visual experience is provided for cinema and television that is otherwise not available or effective in conventional, prior art two dimensional screening approaches.

In one embodiment, after two different focusing priority versions of the same lens image are collected, a range of options in screening the resulting material is provided that is otherwise not possible with a prior art single lens image recording. In one configuration, image data acquired from two sources (such as cameras/digitizing or other imaging means/units) during the "production" phase, provide information to manifest with the incorporation of other features, a dual-leveled visual experience for an audience.

Preferably, rear projection of a selectable size, for example, to a screen measured in 20 feet in diameter, may manifest a projection of digital data from multi focus configuration camera 100 focused for those elements that are further away in the captured image, or the data recorded by the camera wherein the focus ring is configured for the distant focus, for example, in a focus priority choice.

Additional digital data from another unit can be used in a variety of ways. For example, a clear LCD or liquid crystal or other "flat" image manifesting apparatus might be situated at a variably far distance and located between the viewers and the rear projection image (described above). Light or other element(s) may be imposed on the "flat" image manifesting apparatus from the front, in order to produce an opaque or semi opaque image. This effect further provides a variably transparent effect in the zones of the image in which image information is not "sharp" or with cleanly resolved lines/boundaries.

Within a selectively transparent or translucent screen, known technology is preferably utilized that provides for a liquid (e.g., plasma, or metal such as mercury or other liquid substance) to be quickly relocated, electronically or otherwise, to horizontal and/or vertical zones within the screen, such as a transparent containment with means to reallocate the liquid. In case the transparent screen does not complete resolve the selected image data from the foreground (e.g., near focus camera data), then the front projection apparatus of the image data, coupled with a directable, opaque or semi opaque screen mask created electronically, preferably provides a screen with transparent portions where the points of focus in the original lens image were distant. Alternatively, opaque portions are provided that represent the shapes of objects within the original lens image that were selectively near, or "foreground." Moreover, as described above with reference to FIGS. 3A and 3B, the image is manifest within the mechanism of the foreground selectively transparent screen or by way of a front projected image and variably opaque, variably masked screen, (wherein opaque portions of the "screen" move and reconfigure as fast, if not only nearly as fast, as the actual shifts of position of the foreground elements in the original lens image.

The resulting effect and visual is three-dimensional, without a need for familiar colored glass or the like to divide image data for the effect. Herein, the two (or more) focus choices of the same lens image, represented by the two (or more) screens positioned in front of viewers, achieve a three dimensional, or layered visual experience.

Additional means, including reducing the background screen visual in size to compensate for the foreground elements' size that occur on the screen nearer the viewers, is provided to avoid "bleeding" of blurred versions of elements from the far focused capture of the same lens visual. Moreover, the rear (i.e., far focus) screen can be of the rear projection type, or other familiar image manifesting apparatus. Similar to the near screen's data, the far screen's data may be affected to eliminate, mask or otherwise alter the image data reading to appear "soft," or related to the "out of focus," (i.e., near) elements. The selected affect and selective featuring of the focused and out of focus elements, size of the manifested image, and distance between two or more display screens, brightness or coloring or other digital visual data altering approach for aesthetic and perceptual effect, are variables included among those creating the experience and the perceptual interest of the experience.

Other means to provide a transparent, semi opaque, variably opaque, or variably masked "foreground" screen, or foreground image manifested, may be employed other than the "transparent" and/or electronically allocated masking opaque liquid approach, herein. More generally, a capture and manifestation of two focus selections (or differently focused recordings, such as one near and one far) of the same original lens image (or image capture by two or more lenses, positioned relatively near to each other) enable a display, preferably by projection or other means, of visuals on variably displaced, variably opaque (or semi-opaque, or variably transparent) displays for the purpose of exploiting the respective two resolved versions of different focus priority aspects of the same visual. Accordingly, this creates a unique viewing experience not provided by, for example, projected 35 mm film of a typical file release.

Some options relate to selectively capturing and displaying differently focused images from a single scene, that are preferably captured through the same lens for the purpose of an enhanced (e.g., three-dimensional theatrical and home theater) experience.

U.S. Pat. No. 5,687,011 (the '011 patent) discloses a film/video hybrid camera configuration. The following describes a process for using a hybrid camera for the purpose of capturing multiple focusing priority versions of the same scene and/or lens image, as opposed to capturing a single lens image on multiple media. The following is not intended to preclude differently focused versions of the same (or similar) visual(s) that may be recorded on different media, however in a preferred embodiment, differently focused media are recorded on similar media for the primary objective and effects described herein.

As described above, with reference to FIGS. 2 and 3, projection onto one or more screens, or a display by non-projection type display, of two focusing aspects of a single lens image, or two lens images of the same scene is provided. In one embodiment, two cameras are situated in close proximity, or, alternatively, two lenses having one housing in a single, specialized camera is used. Separate recordings may selectively be provided on a single recording medium (e.g., tape, disc, drive or other) or more than one media, depending on the selected apparatus for differentiating between the captured and differently focused versions of the original scene.

The camera(s) are preferably selectively set and configured to provide a selectively shallow "depth of field" for a superior resulting effect and to enhance a display/view objective. Ideally three-dimensional rendition of the captured scene is created for viewer(s). A "shallow" depth of field, leaving the background "blurry" in the capture by the near focused recorded (and/or displayed) visuals and leaving the near elements "blurry" in the far focused recorded (and/or displayed) visuals are preferred for optimal effect. Additional postproduction alterations and/or digital modifications to the visuals captured may enhance the selectively focused elements of the visuals.

Furthermore, intermittent projection is provided to allow for variably fast (e.g., up to 24 or 30 frames per second, "fps", or faster) of near focus, with a constant display or synched intermittent display of far focused images from recording(s). The near and far focused images are preferably taken by a single or two cameras, and relate to the same scene and/or same lens image. These may be manifest on the same display, or on multiple displays, one positioned closer to the projector (and/or viewer(s)) than the other.

As note above, this process and apparatuses provide two differently focused recordings of the same lens image, or of a scene photographed by lenses in close proximity to each other, to two screens, one foreground one background. In a single camera configuration, diverter 108 may be a beam splitter or the like, which fragments the lens image/light to two or more separate image capture devices, which may be electronic or otherwise. Alternatively, intermittent relaying of the full lens image to one capturing device (CCD(s), film or otherwise) is provided, and another capturing device may be employed thereafter by moving mirror means or other known approaches to diverting lens visuals to more than one destination for viewing and/or capture.

The background screen can be of the rear projection or front projection type and may be situated selectively far from the front screen. The front screen may accomplish selective light transmission by way of its composition and/or mechanical elements, which, as described above, preferably alter the screen to allow light transmissibility, or other familiar means to accomplish selective (and/or intermittent) light transmissibility. Thus, the position or even composition of the screens is not as significant as the display on one or more planes of multiple focused versions of a scene. The multiple versions are captured selectively simultaneously, or, alternatively, in acceptable time frames to allow for the enhanced viewing effect described herein.

The foreground display 212 preferably includes a semi-opaque feature, and operates to provide a selectively transparent aspect, thereby selectively permitting light to pass through the foreground display screen. Alternatively, the foreground display 212 may have physical opaquing option to make the screen selectively reflective and non-light transmissible. For example, foreground display screen includes moving surfaces or elements that are configured as a solid, liquid or otherwise, which in one position or situation reflect light provided by a front situated projector, and in another position or situation allow projected light to pass through. Therefore, light may be provided to the foreground display screen that is positioned behind the foreground display screen, relative to the projector(s). The foreground and/or background screen may also be selectively of the light generating (display) type. In a physically opaquing version of the "front screen," this shift from light transmissible to light reflective, should preferably happen as quickly and often as the "front image projector" projects a visual (e.g., light) such as 24 times per second, for example.

One skilled in the art will recognize that intermittently projecting near focus, or foreground focused, and background or other focusing priority version(s) of a scene captured initially by the camera(s) may selectively occur on a single screen for a simpler enhanced visual effect. These differently focused versions of the same scene may be alternate and be presented as "frames" or pictures in a selectable sequence, such as a foreground focused visual, then background focused visual, and then foreground focused visual and then background focused visual, etc., for example providing twelve (12) of each to the viewer(s)' eyes per second, in a 24 frames per second configuration, overall.

Furthermore, the visuals may be projected by a single projector capable of providing relevant image information intermittently to the front and rear screens. In a two projector configuration, one projector provides the visual data from the "near focused" version of the scene photographed, selectively intermittently and depending on the selectively light transmissible aspect of the near screen. A second projector may provide in a front projected embodiment, a projection to the rear projection, when the front projector is in a mode to allow the projector's light to pass through the first screen's position, to reflect off the rear screen that is preferably positioned farther away. Data are preferably be provided to these projectors from the recorded visuals (digital recordings, film or other) and stored within a selected medium or selected media.

Each projector may provide a film or digital visual selectively intermittently. For example, the near projector and far projector may be synchronized thereby allowing one to be in the "dark" mode (i.e., not projecting an image) while the other projector is a "light" mode (i.e., projecting a visual to its respective screen). Both projectors are preferably selectively synchronized with the screen(s) specifically (though not necessarily) with the near screen to allow for the "far projector" to project light (an image) while the front screen is in the transmissible mode. This embodiment is preferable in case, for example, transmissibility is not possible at all times in a selective configuration involving a constantly and selectably light transmissible, and image rendering, front screen.

Shifting "modes" that relate enabling a front screen to allow light to pass, and then providing a reflective surface for a near project to manifest visuals on, should preferably occur not less that twenty-four (24) times per second in order to maintain the "intermittent" image illusion familiar to theatre and television audiences.

The result of the selective multiple focus captures and displays of a scene provides an audience and/or viewer(s) with an enhanced viewing experience not found in a single focus and display recording of a scene, typical to movies and television in the prior art.

Although the present invention is described with particular reference to an enhanced and, preferably, a three-dimensional visual effect, the invention s not so limited. More particularly, the present invention's dual and/or hybrid camera(s) configuration employed for the purpose of capturing multiple focusing priority versions of a single scene (and/or lens image(s)) also provides options not limited to the enhanced viewing goal. For example, versions that are recorded on one or more storage means, may provided additional post production options and latitude, including utilizing multiple focused versions of a single scene to provided a "combined visual" version, embodying aspects of each of the multiple versions, selectively. One use of such a post production application might be to provide a final rendition of a low-light scene captured, wherein the depth of field limitations often affected by limited lighting are addressed by the combination of differently focused "versions" of the same scene, to allow for more than one focusing priority (such as foreground and background) to be displayed within the final, "combined" visual, selectively created from the image data related to the differently focused recordings of the same scene and/or lens image.

Moreover, the hybrid configuration of the camera 100 may be known to current high definition digital units, or other image capture devices, still or otherwise. Alternatively, camera 100 may be embodied in a radical new design. For example, the CINE ALTA camera by SONY, might have the slight visual modification of a housing around the lensing, (similar to a TV studio camera) to allow for additional lensing elements, to allow for mirrored relay of the lens image to two destinations, or beam splitting means to fragment the lens image for recording the two differentiated versions (e.g., differently focused) of the lens image.

Alternatively, the single recording means (tape or otherwise) may be unaltered with both "versions" recorded on the same media, with timecode or other familiar referencing for distinguishing between the two (or more) viewpoints of the same visual, as captured. The tape might run at a selectively faster speed to allow for single storage means to be applied to the two distinctively different focused versions being recorded, if need be to maintain image quality. In the instance of full lens image (from a single capture lens) being relayed to two distinct imaging units, the familiar fast frames-per-second scanning options might apply, such as 60 full frames of digital video (60 electronically captured visuals per second) or other selected speed appropriate to allow for dual capture of a single lens image, if a single lens is selected by the user.

Such a camera can be versatile, thereby allowing selectively for full lens image at a selected frame rate to be relayed as a single recording, (conventional visual) or in the dual (stereo) mode, the second lensing and/or focusing means might be engaged selectively, to allow for capture of that as well. Moreover, a single CCD, film or other image capture means may be employed in a configuration, allowing for the split image (and/or differently focused version of the lens image and/or scene captured) to be relayed to a single imaging device, such as CCD, as simple application of time code or other reference to distinguish between the versions being stored is all that need be applied for post production, and/or playback reference, for example. Other configurations might employ optical options allowing for multiple image capture of differently focused versions of a lens visual without splitting the visual either by beam splitting means, mirrored interruption of the lens image provided, or other such means. Further optical options, involving fast or alternate shifting of focus by a single lens during capture to allow a single lens to alter focus multiple times in a single second, might be employed; the same might be employed in projection, precluding multiple display electronics, involving a single image manifesting unit, involving one or multiple projection lenses.

In all configurations, it is likely the desired design would allow other lensing aspect and elements to occur prior to the focusing element(s) which would occur following the chosen image division means, (full image relayed intermittently to each CCD or other selected capture means, or partial selectively constant image relay to more than on image capture means).

It is also important to say that the division of focus need not be accomplished optically, this might be a digital function of the camera or a post production application, not requiring the physical division of the captured image during "shooting" as two distinct captured visuals.

During "projection," or screening of the final visuals, versatility is shown in a limited time of the "near screens" reflective availability, (e.g., time allotted for manifesting the foreground focused version of the scene), the frame rate of the system may need to slave, or occur accordingly to manifest a full visual (from digital or other image information), within the available "screen opaqueness" time. This, before viewers are exposed to the "far focused," or background visual and more distant screen, in a multiple screen embodiment.

In yet a further embodiment of the screening aspect, means to display virtually unlimited versions of a scene is provided within a selectively transparent "cube" or selectively deep screening "zone" (relative to intended viewers.) Image aspects potentially captured in and around the time that image data is captured, may provide necessary information to manifest selected image aspects (as small as a single pixel, or the equivalent), at distinct distances within the "cube" or "zone" from viewers. This information may be provided within image data or provided all or in part by separately gathered non image data, including data pertaining to image aspects' positions relative to each other, relative to the camera, both, or relative to other selective points useful in establishing a "relief map" of image aspects. This map may be employed in manifesting image aspects at selected, distinct distances from intended viewers, with the "cube" or "zone" display system.

This manifesting may be accomplished by way of internal display mechanics, (the "cube,") or may be affected by externally generated stimuli, (such as laser, magnetic resonance or other electronically generated means), which have the capability of causing aspects of the cube, or display zone, to alter visibly. These visible alterations, or changes" may result in a complete impression of a full multidimensional image occurring throughout the depth zone of the "cube," when viewed from specific area (s) or points, relative to this display zone (cube.)

Thus, the system, apparatus and method may be utilized for single from (still) photography as well, where a three dimensional display may provide a semi opaque, or electronic display means similar or the same to the motion video display disclosed herein, even if in a small configuration such as a window display or kiosk, or other small venue display, even if the size of a single computer notebook screen. Further, in still photography the dual-focus capture may allow for additional flexibility in post production options on such photographs, before limited by depth of field and other issues altered, or circumvented by the options provided by configurations of the present invention.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A system, comprising:
   a first optics module having a first focal length;
   a second optics module having a second focal length different from the first focal length;
   a lens image diverter configured to simultaneously relay light from a lens to the first optics module and the second optics module;
   a first capture device configured to capture a first series of images from the light after being relayed through the first optics module;
   a second capture device configured to capture a second series of images from the light after being relayed through the second optics module; and
   a device configured to resize the second series of images based upon a difference in display distance between the second series of images and the first series of images.

2. The system of claim 1, wherein the lens image diverter is a beam splitting device configured to divide the light from the lens.

3. The system of claim 1, wherein the lens image diverter is a mirroring type configured to provide up to full relay of the light from the lens to the first optics module and the second optics module.

4. The system of claim 1, further comprising:
   a memory configured to store the first series of images and the second series of images.

5. The system of claim 1, wherein the first capture device is further configured to capture the first series of images at a first frame rate and the second capture device is further configured to capture the second series of images at a second frame rate different from the first frame rate.

6. The system of claim 1, further comprising:
   a time-code recorder configured to add time-code information to the first series of images and the second series of images.

7. The system of claim 6, further comprising:
   a display device configured to synchronously display the first series of images overlaid on the second series of images in accordance with the time-code information in a three-dimensional display.

8. A system, comprising:
   means for focusing light;
   means for simultaneously relaying the light to a first optics module having a first focal length and a second optics module having a second focal length that is different from the first focal length;
   means for capturing a first series of images from the light after being relayed through the first optics module;
   means for capturing a second series of images from the light after being relayed through the second optics module; and
   means for resizing the second series of images based upon a difference in display distance between the second series of images and the first series of images.

9. A system, comprising:
   a first optics module having a first focal length;
   a second optics module having a second focal length that is different from the first focal length;
   a relaying module configured to simultaneously relay light indicative of a scene to the first optics module and the second optics module;
   a first charged coupled device configured to generate a first series of images from light focused through the first optics module;
   a second charged coupled device configured to generate a second series of images from light focused through the second optics module; and
   a device configured to resize the second series of images as a function of a difference in display distance between the second series of images and the first series of images.

10. The system of claim 9, further comprising a time-code recorder configured to add time-code information to the first series of images and the second series of images.

11. The system of claim 10, further comprising a display device configured to synchronously display the first series of images overlaid on the second series of images in accordance with the time-code information in a three-dimensional display.

12. The system of claim 9, wherein the first charged coupled device is further configured to generate the first series of images at a first capture rate and the second charged coupled device is configured to generate the second series of images at a second capture rate that is different from the first capture rate.

13. The system of claim 12, wherein the first capture rate is higher than the second capture rate.

14. A tangible computer readable medium including computer executable instructions, the instructions comprising:
   instructions for generating a first series of images from light relayed from a lens through a first optics module having a first focal length;
   instructions for generating a second series of images from the light relayed from the lens through a second optics module having a second focal length that is distinct from the first focal length, wherein the instructions for generating the second series of images include instructions for generating the second series of images; and
   instructions for resizing the second series of images based on a difference in display distance between the second series of images and the first series of images.

15. The tangible computer readable medium of claim 14, wherein instructions for generating the first series of images comprise instructions for generating the first series of images at a capture rate that is different from a capture rate of the second series of images.

16. The tangible computer readable medium of claim 14, further comprising instructions for storing the first series of images and second series of images.

17. The tangible computer readable medium of claim 14, further comprising instructions for adding time-code information to the first series of images and the second series of images.

18. The tangible computer readable medium of claim 17 further comprising instructions for synchronously displaying the first series of images overlaid on the second series of images in accordance with the time-code information in a three-dimensional display.

19. An apparatus, comprising:
   a first digitizing unit configured to record a first series of images from light relayed from a lens through a first optics module having a first focal length;
   a second digitizing unit configured to record a second series of images from the light relayed from the lens through a second optics module having a second focal length that is distinct from the first focal length, wherein the second digitizing unit is further configured to record the second series of images; and
   a device configured to resize the second series of images as a function of a difference in display distance between the second series of images and the first series of images.

20. The apparatus of claim 19, further comprising a time-code recorder configured to add time-code information to the first series of images and the second series of images.

* * * * *

UNITED STATES PATENT AND TRADEMARK OFFICE
CERTIFICATE OF CORRECTION

| | |
|---|---|
| PATENT NO. | : 8,194,168 B2 |
| APPLICATION NO. | : 11/447406 |
| DATED | : June 5, 2012 |
| INVENTOR(S) | : Mowry |

It is certified that error appears in the above-identified patent and that said Letters Patent is hereby corrected as shown below:

ON THE TITLE PAGE:

Item (56), under "OTHER PUBLICATIONS", in Column 2, Line 2, delete "Internaitonal" and insert -- International --, therefor.

IN THE SPECIFICATIONS:

In Column 3, Line 8, delete "DESCRIPTION" and insert -- DETAILED DESCRIPTION --, therefor.

In Column 4, Line 15, delete "opaqing" and insert -- opaquing --, therefor.

Signed and Sealed this
Sixteenth Day of October, 2012

David J. Kappos
*Director of the United States Patent and Trademark Office*